United States Patent Office
3,405,745
Patented Oct. 15, 1968

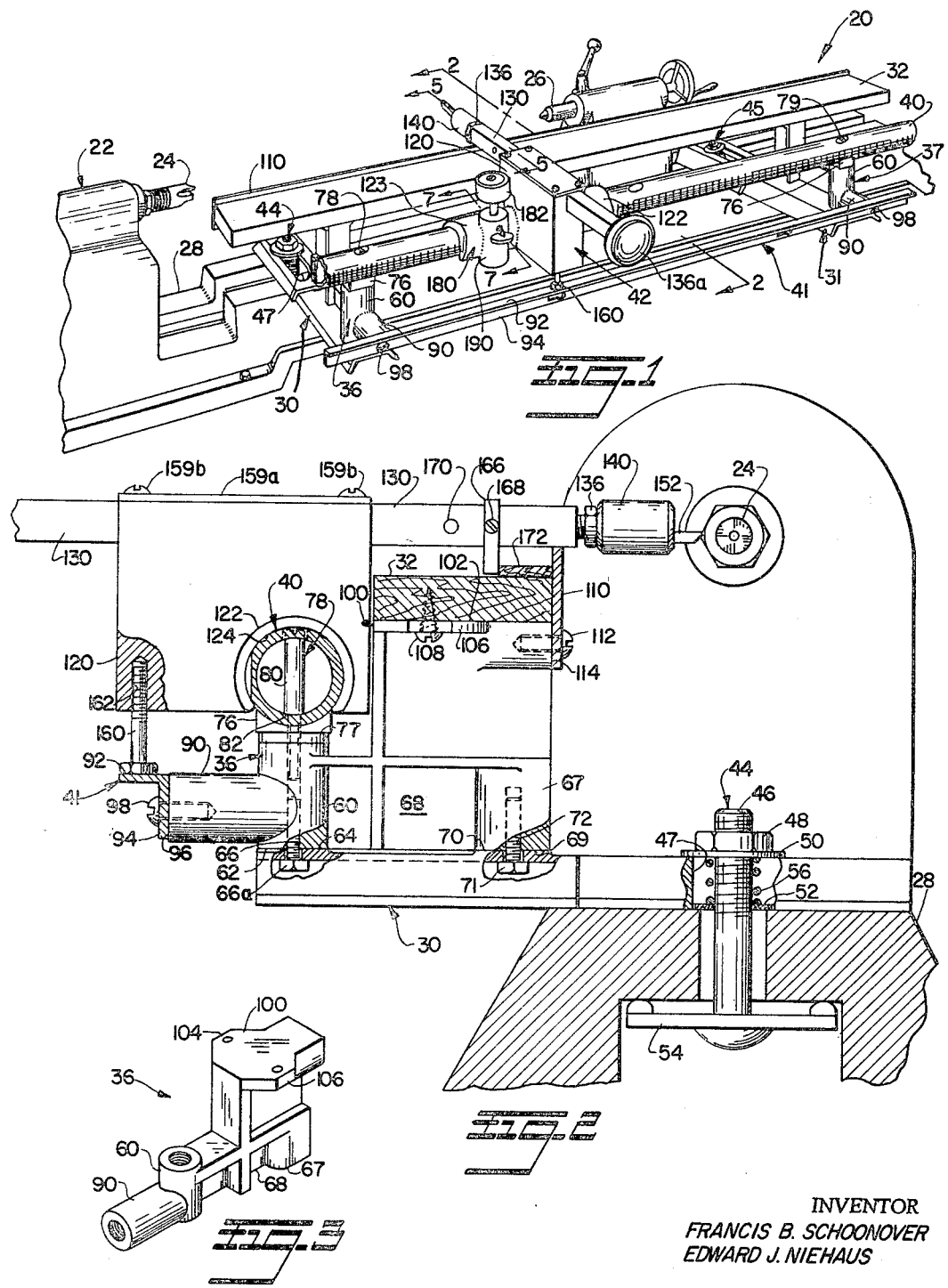

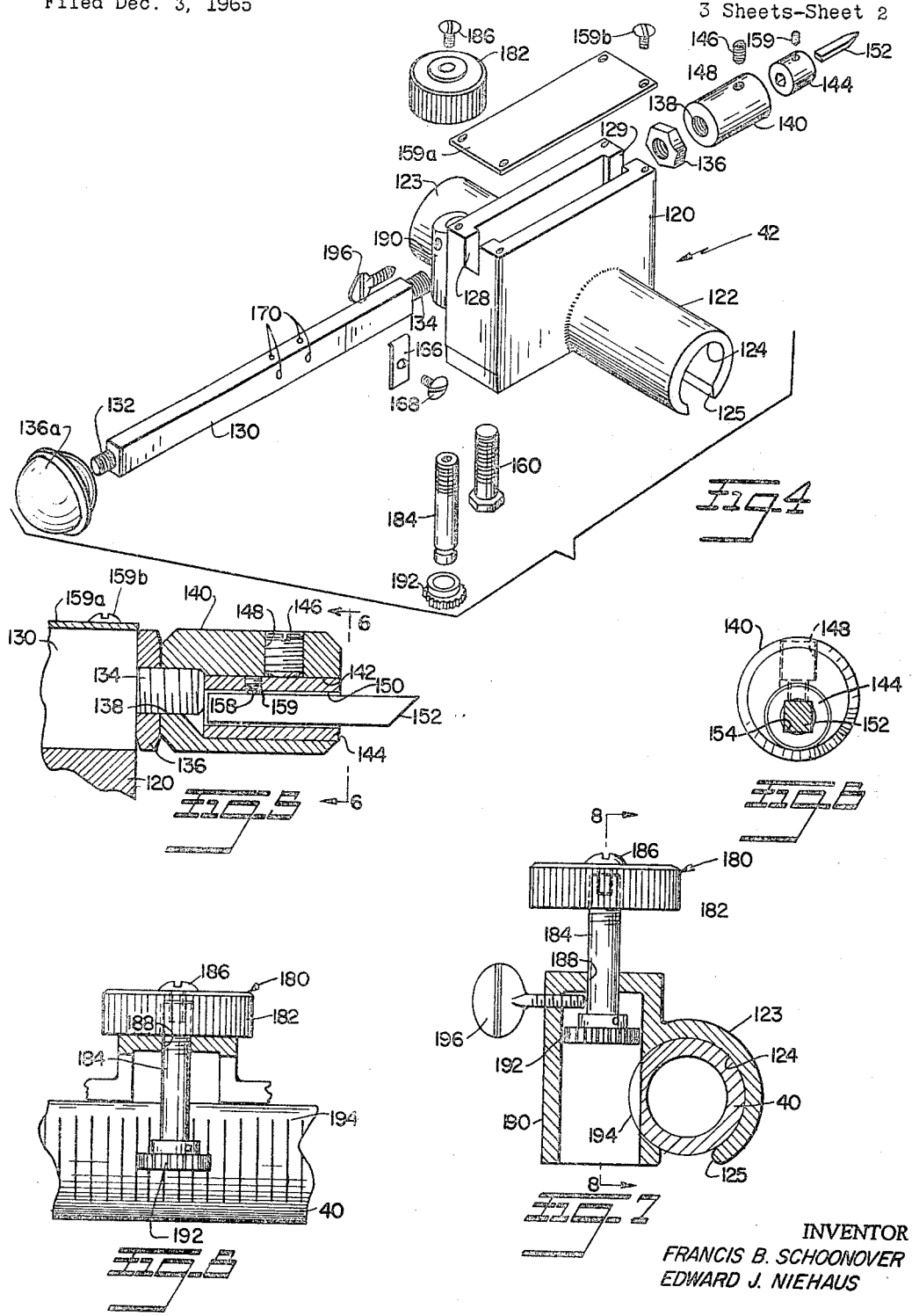

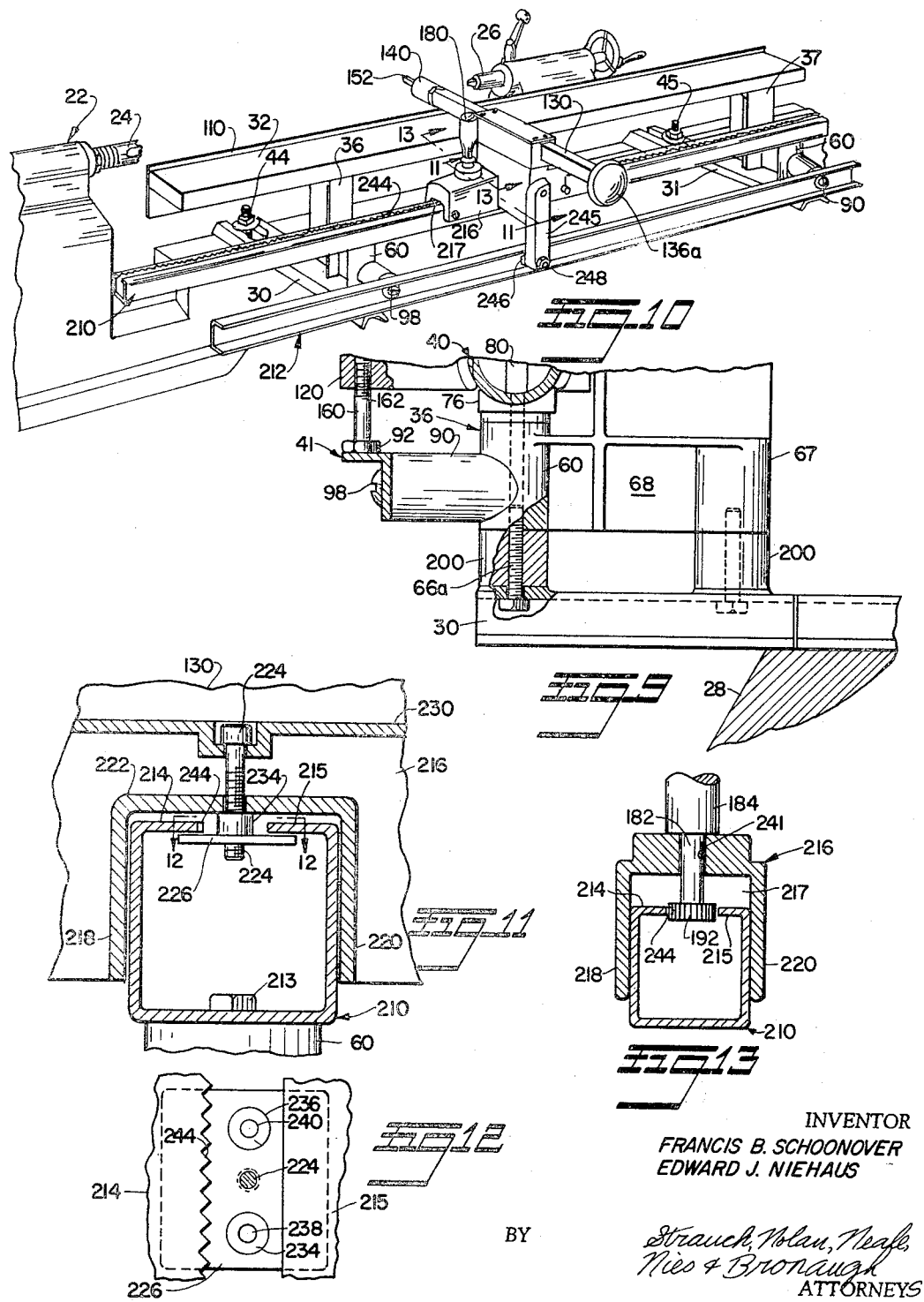

3,405,745
WOOD TURNING DUPLICATOR
Francis B. Schoonover, Lewiston, N.Y., and Edward J. Niehaus, Pittsburgh, Pa., assignors to Rockwell Manufacturing Company, Pittsburgh, Pa., a corporation of Pennsylvania
Filed Dec. 3, 1965, Ser. No. 511,541
15 Claims. (Cl. 142—1)

ABSTRACT OF THE DISCLOSURE

A duplicator attachment for use with wood cutting lathes and comprising a pair of brackets detachably mounted on the lathe ways for supporting a pair of tool slide guide rails and a template-supporting table. The template-supporting table is mounted in the region between the sub-assembly of the guide rails and the nearest lathe way to the operator and is at an elevation which is higher than the lathe ways and the guide rails. A tool slide, supporting a tool bar, is slidable along the guide rails. The tool bar is manually displaceable toward and away from a work piece mounted in the lathe, and a stylus depends from the tool bar for arresting engagement with the preformed edge of the template on the table.

---

This invention is related to lathe attachments and more specifically, to a duplicator attachment for use with good turning lathes.

A major object of this invention is to provide a novel wood turning duplicator lathe attachment for quickly and accurately reproducing wood turnings from a template or the like.

Another object of this invention is to provide a novel wood turning duplicator lathe attachment adapted to be detachably mounted on the ways of a wood turning lathe and having a unique, simplified bracket construction for supporting a tool carrying cross-slide and a template from which reproductions are to be made.

Still another object of this invention is to provide a novel wood turning, duplicator attachment tool support of simplified construction for adjusting the vertical position of a tool relative to a workpiece mounted between support centers in wood lathe.

Yet another object of this invention is to provide a novel wood turning duplicator lathe attachment wherein a template from which reproductions are to be made is conveniently supported for ready access and inspection closely between the workpiece in the lathe and a laterally spaced guide rail on which a tool carrying cross-slide is mounted for movement parallel to the work support axis of the lathe.

A further object of this invention is to provide a novel wood turning duplicator lathe attachment having a fine feed mechanism for selectively advancing a tool bit axially along a workpiece to facilitate the reproduction of fine details.

Another object of this invention is to provide a wood turning duplicator lathe attachment having a novel guide rail and tool carrying cross-slide assembly wherein binding of the cross-slide is alleviated even though the guide rails are not properly arranged in parallel relation to each other.

Still another object of this invention is to provide a novel wood turning duplicator lathe attachment which can easily and quickly be installed on a conventional lathe.

Yet, another object of this invention is to provide a novel duplicator attachment which is readily adapted for use with lathes of different sizes.

These and other objects of the present invention will become apparent from the following description and appended claims when read in conjunction with the accompanying drawings wherein:

FIGURE 1 is a perspective view of the lathe attachment of this invention as mounted on a wood turning lathe;

FIGURE 2 is a section taken substantially along line 2—2 of FIGURE 1;

FIGURE 3 is a perspective view of one of the guide rail support brackets shown in FIGURE 1;

FIGURE 4 is an exploded view of the cross-slide assembly shown in FIGURE 1;

FIGURE 5 is a section taken substantially along lines 5—5 of FIGURE 1 and illustrating details of the tool bit cross-slide support constructed according to this invention;

FIGURE 6 is a section taken substantially along lines 6—6 of FIGURE 5;

FIGURE 7 is a section taken substantially along lines 7—7 of FIGURE 1 and illustarting details of the fine feed mechanism of this invention;

FIGURE 8 is a section taken substantially along lines 8—8 of FIGURE 7 and showing the fine feed mechanism drive connected to axially advance the cross-slide assembly along its guide rails;

FIGURE 9 is a fragmentary section similar to FIGURE 2 and illustrating the duplicator attachment adapted for use with a larger size lathe;

FIGURE 10 is a perspective view of another embodiment of this invention;

FIGURE 11 is a section taken substantially along lines 11—11 of FIGURE 10;

FIGURE 12 is a section taken substantially along lines 12—12 of FIGURE 11; and

. FIGURE 13 is a section taken substantially along lines 13—13 of FIGURE 10.

Referring now to the drawings, wherein like reference numerals have been used to identify like parts, FIGURE 1 illustrates a duplicator attachment 20 constructed according to the principles of this invention and detachably mounted on a conventional wood lathe 22. Lathe 22 comprises a headstock spindle 24 and a tailstock spindle 26 mounted in the usual manner at opposite ends of a lathe bed comprising lathe ways 28. The principal parts of attachment 20 include a pair of channel-shaped brackets 30 and 31 preferably of identical construction, a template support table 32, a pair of identically constructed support brackets 36 and 37 for mounting table 32 and a pair of longitudinally extending, parallel cross slide guide rails 40 and 41, and a cross slide assembly 42 slidably mounted for axial movement along guide rails 40 and 41.

Brackets 30 and 31, as shown in FIGURES 1 and 2, are detachably clamped to the lathe bed by assemblies 44 and 45 respectively. Assembly 44 comprises a bolt 46 extending upwardly between lathe ways 28 and through a horizontal, rearwardly opening slot 47 formed in bracket 30 substantially at right angles to the lathe bed. A nut 48 threaded onto the upper end bolt 46 seats a washer 50 on a flat, horizontally extending section of bracket 30 in which slot 47 is formed. Bolt 46 extends through a further washer 52 and a plate 54. Plate 54 is clamped between the underside of lathe ways 28 and the head of bolt 46 by tightening nut 48. Bracket 30 thus is rigidly, detachably clamped between washer 50 and the top surfaces of lathe ways 28. Washer 52 is clamped between bracket 30 and the top of the lathe bed. A helically coiled spring 56 surrounding bolt 46 biases washers 50 and 52 axially apart and seats washer 54 on lathe ways 28 to retain assembly 44 in place on the lathe bed before mounting bracket 30.

Assembly 45 for clamping bracket 31 in place on the lathe bed is preferably of the same construction as assembly 44, like reference numerals being used to identify like parts.

As shown in FIGURE 1, brackets 30 and 31 extend substantially at right angles to and laterally beyond the lathe bed and are disposed in parallel spaced apart relation adjacent headstock spindle 24 and tailstock spindle 26 respectively. Slots 47 provide for adjustment of brackets 30 and 31 transversely of the lathe bed. Brackets 30 and 31 together with their respective clamping assemblies 44 and 45 also may be shifted toward and away from each other simply by loosening nuts 48.

Still referring to FIGURES 1 and 2, bracket 36 is formed with a vertical, cylindrical boss portion 60 having a planar end face 62 which is seated on a raised, flat, apertured face 64 formed on the horizontal section of bracket 30. Faces 62 and 64 are accurately machined finished to extend at right angles to a tapped longitudinal bore 66 formed through boss portion 60 coaxially of face 62. A cap screw 66a extending upwardly through the aperture in face 62 is threaded into bore 66 to detachably fix the front end of bracket 36 to the end of bracket 30 projecting beyond the front side of the lathe bed.

As best shown in FIGURE 2, bracket 36 is formed with a further boss portion 67 which is integrally joined to boss portion 60 by a web section 68. Boss portion 67, which is parallel with boss portion 60, is formed with a machined, flat end face 69 which is seated on a raised, planar, apertured face 70 on bracket 30. A cap screw 71 extending upwardly through bracket 30 in coaxial relation with end face 70 is threaded into a tapped bore 72 coaxially formed in boss portion 67 to thus rigidly secure the rearward end of bracket 36 to bracket 30. The axes of bores 66 and 72 are in parallel spaced apart relation and are contained in a common plane medially intersecting slot 47. The interfaces between faces 62 and 64 and faces 69 and 70 are also contained in a common plane normally intersecting the axes of bores 66 and 72.

Bracket 37 is detachably mounted on bracket 31 in the same manner as the mounting of bracket 36 on bracket 30. Accordingly, like reference numerals have been used to identify like parts. It thus will be appreciated that brackets 36 and 37 are supported in cantilever fashion from the lathe bed by brackets 30 and 31.

With continued reference to FIGURES 1 and 2, guide rail 40 is shown to comprise a straight tubular member which is seated at axially spaced apart regions on a pair of spacer blocks 76. The upwardly facing seating surface of blocks 76 are concave to cradle and interfit with guide rail 40. The bottom faces of spacer blocks 76 are planar and are seated on upwardly facing end faces 77 of boss portions 60. End faces 77 are machined flat and are contained in a common horizontal plane which is parallel with the plane containing boss faces 62 and 69.

Guide rail 40 is detachably fixed to brackets 36 and 37 by machine screws 78 and 79. Screws 78 and 79 each have diametrically enlarged, cylindrically smooth sections 80 extending through aligned apertures which are formed in guide rail 40 along an axis extending at right angles to the longitudinal axis thereof. The lower threaded ends of screws 78 and 79 extend freely through aligning bores in spacer blocks 76 and are threaded into bores 66 in brackets 36 and 37. Each of the diametrically enlarged sections 80 of screws 78 and 79 provides an annular axially downwardly facing shoulder 82 which seats against the inner periphery of guide rail 40. Guide rail 40 thus is detachably clamped between shoulders 82 and spacer blocks 76. Screws 78 and 79 are of special headless construction having upper tool engaging ends which are disposed radially inwardly of the outer periphery of guide rail 40 to avoid interference with the movement of cross slide assembly 42.

With continued reference to FIGURES 1 and 2, brackets 36 and 37 are each integrally formed with boss sections 90 extending forwardly from and at right angles to boss portions 60 for mounting guide rail 41. Guide rail 41 in this embodiment, comprises a structural angle having a horizontal leg 92 and a vertical leg 94 perpendicularly depending from leg 92. Leg 94 is seated against planar end faces 96 formed on boss sections 90 and contained in a common plane extending at right angles to the plane containing end faces 62 and 69. Guide rail 41 is rigidly fixed to boss sections 90 of brackets 36 and 37 by machine screws 98 extending through leg 94 and threaded into tapped bores formed coaxially in boss sections 90. Leg 92 projects forwardly from leg 94 and provides a support surface for slide assembly 42.

From the foregoing description, it is clear that guide rails 40 and 41 are accurately supported in parallel spaced apart relation by the assembly of brackets 30, 31, 36, and 37. Rails 40 and 41 are laterally offset forwardly from the front side of the lathe bed. Rail 41 is disposed forwardly of and at a level located below rail 40.

As shown in FIGURES 1–3, each of the brackets 36 and 37 is integrally formed with a ledge 100 disposed vertically above boss portion 67 and extending forwardly to a juncture with web section 68 between boss portions 60 and 67. The ledges 100 of brackets 36 and 37 are formed with planar, upwardly facing, table support surfaces 102 which are contained in a common plane extending parallel to the plane containing end faces 62 and 69. Table 32, which is shown to have a rectangular cross-section and parallel, flat top and bottom surfaces, is seated at longitudinally spaced apart regions on surfaces 102. The top surface of table 32 is thus parallel to end faces 62, 69, and 77 and extends at right angles to end face 96. A work template thus fixed on the top face of table 32 is accurately oriented with respect to slide guide assembly 42 and to the longitudinal axis between the work turning centers of the lathe.

Advantageously, table 32 is made of suitable wood such as pine. Ledges 100, as shown in FIGURES 3, are each formed integrally with a pair of lateral ears 104 and 106. Wood screws extending through bores formed in ears 104 and 106 are threaded into table 32 to thus detachably fix table 32 to brackets 36 and 37. A flat-sided support plate 110 is fixed by machine screws 112 to brackets 36 and 37 at the rear of ledges 100. Support plate 110 is seated against planar faces 114 formed on brackets 36 and 37 at right angles to surfaces 102 so that the forwardly facing surface of support plate 110 also is at right angles to surfaces 102. Plate 110 extends above ledges 100 to provide a fence for orienting a template on table 32.

From the structure of attachment 20 thus far described, it is evident that the entire assembly of brackets 30, 31, 36, and 37, guide rails 40 and 41, table 32, and cross-slide assembly 42 is removable as a unit from the lathe bed simply by loosening nuts 48.

Cross-slide assembly 42, as shown in FIGURES 1, 2, and 4, comprises a rectangular support base 120 having integral axially aligned boss sections 122 and 123 extending from opposite sides thereof. A bore 124 formed in base 120 extends coaxially through boss sections 122 and 123 and coaxially through boss sections 122 and 123 and coaxially receives guide rail 40. Boss sections 122 and 123 are provided with longitudinal slots 125 to clear the assemblies of spacer blocks 76 and brackets 36 and 37 when base 120 is slid to opposite ends of guide rail 40.

As best shown in FIGURE 4, the end walls of base 120 are formed with aligned, flat-sided, flat-bottomed, upwardly opening channels 128 and 129 at right angles to and above the axis of bore 124. As shown, tool bar 130 extends at both ends axially beyond the end walls of base 120 and is formed with reduced diametered, threaded end sections 132 and 134. A manual control knob 136a is threaded onto end section 132 forwardly of base 120, and a jam nut 136 is threaded onto section 134 rearwardly of base 120.

As best shown in FIGURES 4 and 5, end section 134 protrudes axially beyond jam nut 136 and is threaded into a tapped bore 138 which is coaxially formed in a cylindrical tool support member 140. In accordance with this invention, support member 140 is formed with a smooth-walled eccentric bore 142 which is laterally offset from and parallel to the axis of bore 138 and which coaxially, slidably receives a sleeve-shaped tool holder 144. As shown in FIGURE 5, bore 142 is drilled through the bottom wall of bore 138. Tool holder 144 is axially and non-rotatably, removably fixed in bore 142 by a set screw 146 which is threaded into a tapped transverse bore 148. Bore 148 is formed in support member 140 along an axis normally intersecting the axis of bore 142. Tool holder 144 is coaxially formed with a longitudinal smooth-walled through bore 150 which slidably receives a conventional tool bit 152 having a shank section of generally square cross-section. The longitudinal axis of tool bit 152 thus is parallel to, but laterally offset from the aligned axes of support member 140 and tool bar 130.

Preferably, bore 150 is formed with two pairs of diagonally opposed longitudinally extending, radially inwardly opening grooves 154 (see FIGURE 6) which receives the corners of the tool bit shank section to prevent tool bit 152 from turning relative to tool holder 144. Tool holder 144 is formed with a transverse tapped bore 158 which receives a set screw 159 for engaging and fixing tool bit 152 in place in holder 144. The entire unitary sub-assembly of tool bar 130, nut 136, support member 140, tool holder 144, and tool bit 152 is thus slidably supported on base 120 for selective displacement crosswise of table 42.

Owing to the eccentricity between bores 138 and 142, it will be appreciated that tool bit 152 may be raised and lowered relative to the longitudinal axes of tool bar 130 and the work turning axis of the lathe by threadedly revolving support member 140 about the axis of tool bar 130. Selective adjustment of the vertical position of tool bit 152 thus is readily and easily accomplished simply by threading support member 140 to a selected position. Jam nut 136 is threadedly advanced to a position where it butts against the opposed end face of sleeve 140 to lock it against rotation after the vertical position of tool bit 152 is adjusted. The longitudinal position of tool bit 152 relative to tool holder 144 may be adjusted by loosening set screw 159, and the longitudinal position of tool holder 144 relative to support member 140 may be adjusted by loosening set screw 146.

A cover plate 159a fixed to base 120 by screws 159b confines tool bar 130 against upward displacement from its seated position in channels 128 and 129.

To adjust the angular position of tool bit 152 relative to a horizontal plane, a standard hex head cap screw 160 is threaded into a downwardly opening bore 162 (see FIGURE 2) formed in base 120 along an axis normally intersecting the longitudinal axis of tool bar 130 and forwardly offset from the axis of bore 124. The flat hexagonal head of screw 160 is slidably seated on the upwardly facing flat surface of guide rail leg 92 as shown in FIGURE 1. Thus, base 120 is selectively rotatable in opposite directions about the axis of guide rail 40 by threading screw 160 into and out of bore 162. Screw 160 thus provides for a fine adjustment of the angular position of tool bit 152 relative to a horizontal plane. Seating engagement of the head of screw 160 on guide rail 41 prevents cross-slide assembly 42 from rotating in a counterclockwise direction (as seen from FIGURE 2) about the axis of guide rail 40. To oppose rotation of cross-slide assembly 42 in the opposite direction the flat underside of tool bar 130 is seated on the upper edge of plate 110. As a result of providing tool bar 130 with a non-circular cross section, seating engagement of bar 130 on plate 110 opposes rotation of the tool bar about its longitudinal axis by the torque produced when tool bit 152 is moved into cutting engagement with a rotating work piece in the lathe. Binding of cross-slide assembly 42 on guide rail 40 when rails 40 and 41 are not accurately parallel is avoided since the head of screw 160 is free to ride along leg 92 at an acute angle with the longitudinal axis of rail 41.

As shown in FIGURE 2, a stylus or tool guide 166 is detachably fixed by a machine screw 168 to the portion of tool bar 130 extending vertically above table 32. Additional threaded bores indicated at 170 in FIGURE 4 may be provided in tool bar 130 for locating stylus 166 in different positions relative to table 32 and a template 172 (see FIGURE 2) thereon. Stylus 166, which comprises a thin flat-sided metal plate, depends from tool bar 130 and has opposite side edges which are engageable with preformed edge of template 172.

From the foregoing description it is apparent that brackets 36 and 37 are uniquely constructed to support table 32, guide rail 40, and guide rail 41 in vertically stepped relation, with table 32 being located laterally between lathe ways 28 and rail 40 and at a level that is higher than rails 40 and 41 and the lathe bed. Rail 41 is located forwardly of and lower than rail 40 so that rails 40 and 41 and base 120 do not block the operator's view of template 172, tool bit 152 and the workpiece in the lathe. Template 172 on table 32 thus is readily accessible and is disposed closely adjacent to and about at the same level as the workpiece so that the movement of stylus 166 and tool bit 152 can conveniently be viewed simultaneously by the operator standing in front of the lathe. Cutting of the workpiece is therefore easily controlled to provide an accurate and quality product.

As shown in FIGURES 1, 7, and 8, a fine feed mechanism 180 is provided for micrometer feeding movement of cross-slide assembly 42 longitudinally along guide rails 40 and 41. Mechanism 180 comprises a knurled knob 182 which is coaxially fixed on the upper end of a shaft 184 by a machine screw 186. Shaft 184 is coaxially and rotatably received in a smooth, cylindrical bore 188 formed in a hollow boss section 190. Boss section 190 is formed integral with boss portion 123 along an axis extending at right angles to but laterally offset from the longitudinal axis of bore 124. The axis of shaft 184 is coaxial with the axis of boss section 190.

As shown in FIGURES 7 and 8, a micrometer feed pinion 192 is non-rotatably fixed on the lower end of shaft 184 received in boss section 190. Shaft 184 is axially slidable to a downward position where pinion 192 meshes with a rack 194 formed in the periphery of guide rail 40. The teeth of rack 194 extend substantially the entire length of guide rail 40.

By grasping knob 182, shaft 184 may be raised to a position shown in FIGURE 7 where pinion 192 is out of meshing engagement with rack 194. A thumb screw 196 threaded into boss section 190 may be turned to a position where it engages the periphery of shaft 184 to lock the assembly of shaft 184, pinion 192, and knob 182 in the position of parts shown in FIGURE 7 where pinion 192 is raised out of engagement with rack 194. When thumb screw 196 is threaded out of its bore in boss section 190, shaft 184 may be moved downwardly until the underside of knob 182 seats on the top face of boss section 190 as shown in FIGURE 8. With pinion 192 engaging rack 194, knob 182 may be selectively turned in opposite directions to thereby axially advance cross-slide assembly 42 in opposite directions longitudinally along guide rail 40. Thus, micrometer feeding movement of tool bit 152 longitudinally with respect to a work piece mounted between the work support centers of lathe 22 is afforded for making fine cuts.

To assemble attachment 20 on a lathe, clamping assemblies 44 and 45 are first mounted on the lathe bed in the manner best shown in FIGURE 2. The sub-assembly of brackets 30, 31, 36, and 37, guide rail 41, and table 32 then may be secured to the lathe bed by clamping assemblies 44 and 45 in the manner previously explained. With this sub-assembly in place, the upper guide rail 40 is then secured to brackets 36 and 37 by inserting and tightening screws 78 and 79. Cross-slide assembly 42 then may be slid onto one end of guide rail 40 and moved to an operative position. Alternatively, brackets 30, 31, 36, and 37, rails 40 and 41 and cross-slide assembly 42 may be pre-assembled and mounted as a unit on the lathe bed.

With duplicator attachment 20 now assembled, tool bit 152 may be brought near the point of one of the work turning centers of lathe 22 to adjust the height of the tool bit by revolving support member 140 in the manner already explained. Preferably, support member 140 is revolved until tool bit 152 is approximately 1/16 of an inch above the point of the work turning center. The tool bit also can be moved in or out to a correct position.

The work piece, which usually comprises a wooden block, is mounted between headstock 24 and tailstock 26 in the usual manner. The template may be mounted on a piece of material such as a 1/8 inch hardboard and cut to form. This template is then seated on table 32 and tool bar 130 is axially shifted to move stylus 166 into engagement with the profiled edge of the template. The lathe is then started to turn the work piece and cross-slide assembly 42 is then manually moved either by hand or by using feed mechanism 180 to follow the profiled edge of the template while cutting the work piece.

To adapt duplicator attachment 20 for use with a lathe of larger size than that shown in FIGURES 1–8, four annular spacers 200 of equal length are provided for as shown in FIGURE 9. Spacers 200 are mounted between faces 62 and 64 and between faces 69 and 70 to elevate brackets 36 and 37 and, consequently, cross-slide assembly 42 to a suitable height related to the work turning centers of the lathe. Screws 66a and 71 extend coaxially through spacers 200 and are threaded into bores 66 and 72 as previously described. Spacers 200 are thus axially confined between opposed bore faces on each associated pair of brackets. Thus the adaptation of attachment 20 to different sizes of lathes is easily and conveniently accomplished. For example, attachment 20, without incorporating spacers 200, may be constructed for use with an 11 inch lathe, and the length of the spacers 200 may be such as to adapt attachment 20 for use with a 12 inch lathe. The opposite end faces of spaces 200 are parallel and flat to assure that brackets 36 and 37 are properly oriented with respect to the lathe axis between the work turning centers.

FIGURES 10–13 illustrate a modified embodiment of this invention wherein guide rails 40 and 41 are replaced with guide rails 210 and 212 respectively. Screws 213 (one shown in FIGURE 11) threaded into bores 66 rigidly secure rail 210 to boss portions 60 of brackets 36 and 37. Rail 210 comprises an upwardly opening channel having elongated inwardly turned continuous flanges 214 and 215. Base 120 is replaced with a modified tool support base 216 having a downwardly opening channey 217 through which guide rail 210 slidably extends. Channel 217 is formed with straight parallel side walls 218 and 220 integrally joined together by a straight downwardly face wall 222. Walls 218 and 220 extend downwardly in sliding engagement with the side walls of guide rail 210. Wall 222 is seated on flanges 214 and 215.

Similar to base 120, base 216 has an upwardly opening channel 230 through which tool bar 130 extends. A screw 224 extends downwardly through a bore formed in the bottom wall of channel 230 and is threaded into a slide plate 226. Plate 226 is slidably received between opposed ends of flanges 215 and 216 to guide the cross slide assembly for longitudinal feeling movement along guide rail 210.

Referring to FIGURES 11 and 12, a pair of annular spacers 234 and 236 are seated between opposed surfaces of plate 226 and wall 222. Posts 238 and 240 formed integral with plate 226 extend coaxially into spacers 234 and 236 respectively to thus retain spacers 234 and 236 in place.

Shaft 184 of feed mechanism 180 is shown in FIGURE 13 to be journalled in a bore 241 formed through the bottom wall of channel 217. The assembly of pinion 192, shaft 184 and knob 182 are axially shiftable between operative and inoperative positions in the manner previously described. In the operative feeding position of mechanism 180, pinion 192 meshes with a rack 244 formed on the inwardly facing end of flange 214. Micrometer feeding movement of the cross-slide assembly is thus facilitated in the manner described in connection with the embodiment of FIGURES 1–8.

As shown in FIGURE 10, screw 160 is replaced with roller assembly comprising an arm 245 secured to base 216 and depending downwardly to a region located forwardly of rail 212. Rail 212 comprises a forwardly opening channel-shaped member in which a roller 246 is adapted to ride. Roller 246 is mounted by a shaft 248 on the lower end of arm 245. The axis of shaft 248 extends at substantially right angles to raid 212 and the direction of movement of the cross-slide assembly. Roller 246 rides along the lower flange portion of guide rail 212 and resists pivotal movement of the tool cross-slide about the axis of rail 210.

The invention may be embodied in other specific forms without departing from the spirit or essential characteristics thereof. The present embodiments are therefore to be considered in all respects as illustrattive and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A duplicator attachment for use with wood cutting lathes having conventional work support centers and related lathe ways comprising attachment support means adapted for detachable fixed mounting on said lathe ways and including a pair of tool slide guide rails fixedly mounted on said support means in spaced juxtaposition and extending longitudinally of said lathe ways; a tool slide slidably associated with one of said guide rails and bearing on the other of said guide rails; a table on said support means for mounting a template or the like between said one guide rail and the front lathe way; a tool bar extending cross-wise above said template annd being mounted in said slide for manual axial movement toward and away from a vertical plate containing the axes of said lathe centers; means mounted at the inner end of said tool bar and carrying a turning tool bit; and a stylus depending from said tool bar for arresting engagement with the preformed edge of said template upan manual axial movement of said tool bar, said slide being adapted for manual longitudinal feed movement along said guide rails while said tool bar is maintained with its stylus in engagement with said template to turn a workpiece mounted between said centers in accord with the preformed template.

2. The duplicator attachment of claim 1 wherein said one guide rail is provided with longitudinally extending rack teeth and said slide rotatably mounts a knob and pinion assembly positioned to cooperate with said rack teeth whereby micrometer feed movement of said slide along said guide rails can be effected while said tool bar is manually held to engage its stylus with said template.

3. The duplicator attachment of claim 2 wherein said one guide rail comprises an upwardly opening channel bar having inturned laterally opposed longitudinally continuous flanges along the upper edges of its vertical walls, one of said flanges being formed to provide said rack teeth, said attachment further comprising a slide clamp plate slidingly received in said channel bar behind said inturned flanges and a bolt threaded into said clamp plate and fixing said clamp plate to said slide, said clamp plate cooperating with said inturned flanges to prevent vertical movement of said slide relative to said channel bar.

4. The duplicator attachment of claim 2 wherein said one guide rail comprises a tubular pipe one side of which is formed to provide said rack teeth and wherein said slide is provided with a longitudinally extending through bore shaped to matingly receive said tubular pipe and a right angularly related bore spaced from the axis of said longitudinal extending through bore and rotatably mounting said knob and pinion assembly.

5. The duplicator attachment defined in claim 1 wherein said support means comprises a pair of parts spaced longitudinally apart relative to said guide rails and each providing vertically downwardly stepped surfaces for mounting said table and said one guide rail with said table being disposed at a level that is higher than said one guide rail and said lathe ways.

6. The duplicator attachment defined in claim 5 wherein the other of said guide rails is lower than said one guide rail, and wherein said one of said guide rails is disposed in a region between said other of said guide rails and said table, said tool slide having a portion bearing on said other guide rail to resist pivotal movement of said tool slide in a predetermined direction with respect to said one guide rail, said attachment further comprising a guide plate fixed to said parts and extending above said table adjacent one edge thereof to provide a surface for orienting said template, said tool bar being seated on the upper edge of said guide plate to oppose pivotable movement of said slide about said one guide rail in a direction opposite to said predetermined direction.

7. The duplicator attachment defined in claim 6 wherein said portion of said tool slide comprises a screw threaded into said cross-slide and having a flat head being seated for sliding movement on a continuous, flat, horizontally extending surface of said other guide rail.

8. The duplicator attachment defined in claim 1 wherein said means carrying said tool bit comprises a cylindrical member mounted on the inner end of said tool bar and eccentrically supporting said bit, said cylindrical member being selectively revolvable to swing said tool bit in a circular path to thereby vary the height thereof.

9. The duplicator attachment defined in claim 8 wherein said cylindrical member is coaxially threaded on the inner end of said tool bar and is formed with a bore extending parallel to but laterally offset from its axis of revolution, said tool bit being coaxially fixed in a tool holder which is coaxially received in said bore.

10. A duplicator attachment for use with wood cutting lathes having work support centers and related lathe ways, said attachment comprising a pair of mounting brackets seated on and extending forwardly from said lathe ways, means detachably fixing said brackets to said lathe ways in essentially parallel spaced apart relation, a pair of one-piece support parts respectively detachably fixed on and extending upwardly from the forward ends of said brackets, a pair of parallel vertically downwardly and forwardly stepped horizontal surfaces formed on each of said parts, a template support table seated on the upper horizontal mounting surfaces of said parts and secured to said parts in parallel, forwardly offset relation to the work turning axis between said lathe centers, a first tool slide guide rail mounted on the lower ones of said surfaces in parallel forwardly offset relation to said table, further mounting surfaces formed on said parts, said further surfaces being spaced forwardly from said stepped surfaces in planes extending at right angles to planes containing said stepped surfaces, a second tool slide guide rail seated against said further surfaces in parallel, forwardly and downwardly stepped relation to said first guide rail, a tool slide slidably mounted on said first guide rail, means depending from said slide and bearing on said second guide rail to oppose rotation of said slide in a predetermined direction about the longitudinal axis of said first guide rail, a tool bar extending slide for manual axial movement toward and away from a vertical plane containing the axes of said lathe centers, means mounting a turning tool bit at the inner end of said tool bar, and a stylus depending from said tool bar for arresting engagement with the preformed profile of a template on said table upon axial movement of said tool bar, said slide being adapted for manual longitudinal feeding movement along said guide rails while said tool bar is axially positioned to maintain said stylus in engagement with the profile of said template.

11. The duplicator attachment defined in claim 10 wherein said first guide rail comprises tubular member and wherein said slide is formed with a through bore slidably receiving said tubular member.

12. The duplicator attachment defined in claim 10 comprising spacer means removably mounted vertically between said each support part and associated bracket for elevating said table, said rails, and said slide relative to the work support centers of the lathe.

13. The duplicator attachment defined in claim 6 wherein said other guide rail and said guide plate are seated against oppositely facing parallel surfaces on each of said parts, said oppositely facing surfaces on each part being contained in planes substantially normally intersecting planes containing said downwardly stepped surfaces.

14. The duplicator attachment defined in claim 6 wherein said tool bar is formed with a flat surface seated on said guide plate to oppose rotation of said bar about its longitudinal axis.

15. A duplicator attachment for use with wood cutting lathes having work support centers and related lathe ways, said attachment comprising attachment support means adapted for detachable, fixed mounting on said lathe ways, a tool cross-slide guide rail fixedly mounted on said support means forwardly and longitudinally of said lathe ways, a tool slide slidably mounted on said guide rail, a template support table mounted on said support means, said table being disposed laterally between and raised above said guide rail and said lathe ways on a level closely adjacent to the longitudinal, work turning axis between said lathe centers, a tool bar extending cross wise above a template on said table and being mounted on said slide for manual movement toward and away from a vertical plane containing the axes of said lathe centers, means mounted on the end of said tool bar and carrying a tool turning bit, and a stylus fixed to and depending from said tool bar for arresting engagement with the preformed edge of said template upon manual axial movement of said tool bar, said slide being adapted for manual longitudinal feeding movement along said guide rail while said tool bar is maintained with said stylus in engagement with the preformed edge of said template to turn said workpiece for reproducing the profiled template contour thereon.

References Cited

UNITED STATES PATENTS

| | | | |
|---|---|---|---|
| 3,332,458 | 7/1967 | Baldwin | 142—7 |
| 2,769,466 | 11/1956 | Brauneis | 142—7 |
| 3,204,671 | 9/1965 | Schoenrock | 142—7 |

WILLIAM W. DYER, JR., *Primary Examiner.*

W. D. BRAY, *Assistant Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,405,745                 October 15, 1968

Francis B. Schoonover et al.

It is certified that error appears in the above identified patent and that said Letters Patent are hereby corrected as shown below:

Column 1, line 29, "good" should read -- wood --; line 45, after "in" insert -- a --. Column 4, line 59, cancel "coaxially through boss sections 122 and 123 and". Column 5, line 29, "42" should read -- 32 --. Column 6, line 1, "avis" should read -- axis --. Column 7, lines 54 and 55, "channey" should read -- channel --. Column 8, line 18, "raid" should read -- rail --; line 51, "upan" should read -- upon --.

Signed and sealed this 24th day of February 1970.

(SEAL)
Attest:

Edward M. Fletcher, Jr.
Attesting Officer

WILLIAM E. SCHUYLER, JR.
Commissioner of Patents